April 13, 1926.
R. F. RASMUSSEN
1,580,328
STALL FOR CATTLE AND THE LIKE
Filed August 20, 1921    2 Sheets-Sheet 1
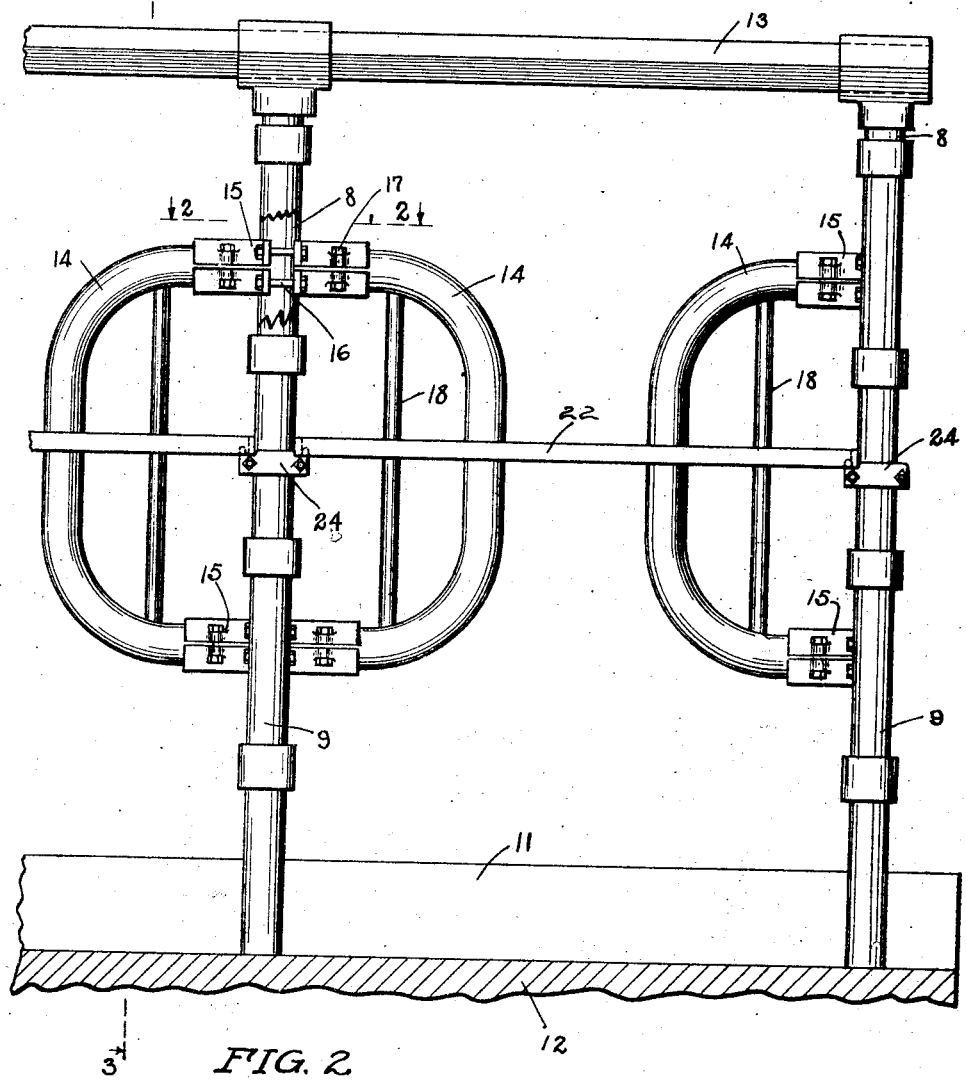
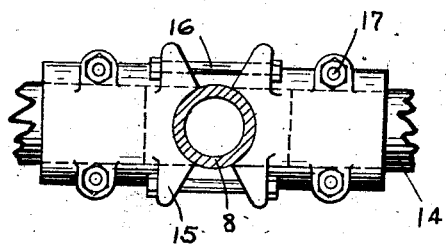
INVENTOR.
BY Robert F. Rasmussen
Morsell + Keeney
ATTORNEYS.

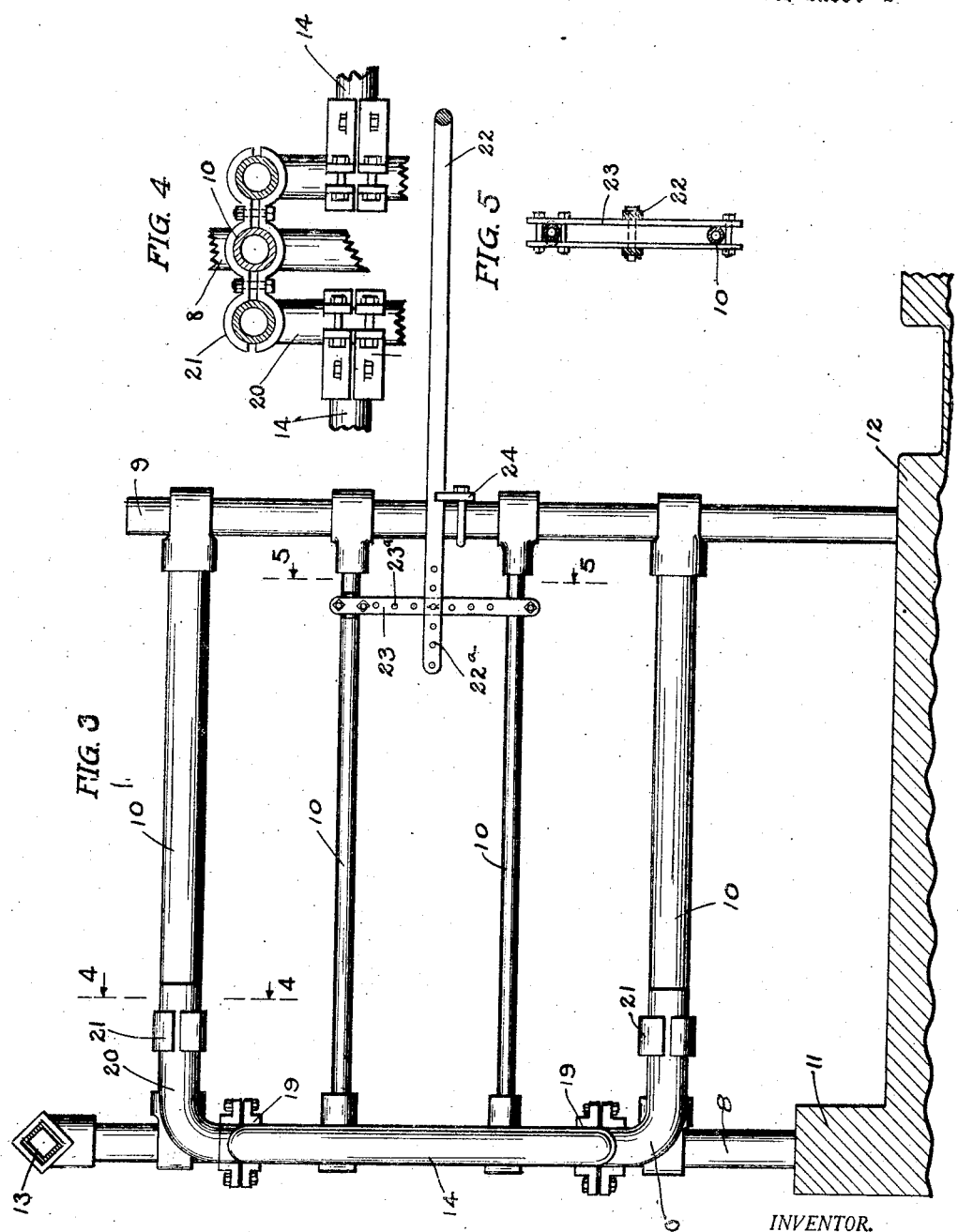

Patented Apr. 13, 1926.

1,580,328

UNITED STATES PATENT OFFICE.

ROBERT F. RASMUSSEN, OF OSHKOSH, WISCONSIN, ASSIGNOR, BY MESNE ASSIGN-MENTS, TO HUDSON MANUFACTURING COMPANY, OF MINNEAPOLIS, MINNESOTA, A CORPORATION OF MINNESOTA.

STALL FOR CATTLE AND THE LIKE.

Application filed August 20, 1921. Serial No. 493,912.

*To all whom it may concern:*

Be it known that I, ROBERT F. RASMUSSEN, a citizen of the United States, and resident of Oshkosh, in the county of Winnebago and State of Wisconsin, have invented new and useful Improvements in Stalls for Cattle and the like, of which the following is a description, reference being had to the accompanying drawings, which are a part of this specification.

This invention relates to improvements in stalls for cattle and the like.

Heretofore dairy-men have usually employed stanchions to hold cattle in their stalls. Various attempts have been made to provide stanchions of such construction that the cattle may assume a comfortable position particularly when lying down; for example, the stanchions have been mounted so as to be capable of swinging on their vertical axis which permits the cows to turn their heads around. This type of stanchion, while allowing the animal certain freedom of movement, does not permit it to have the movements it desires at many times. The primary object of this invention is to provide means at the forward end of the stall to prevent the animal from moving forwardly thereof, which means is of such construction that the animal may readily remove its head and neck from engagement therewith.

In its preferred form the invention contemplates the provision of a pair of U-shaped stop members positioned so that the legs thereof extend toward the respective side walls of the stall, and a further object of the invention is to provide means whereby said U-shaped members may be mounted on the respective side walls of the stall and be adjusted laterally preferably also vertically to accommodate animals of different lengths and heights.

A further object of the invention is to provide novel means, preferably in the form of a U-shaped bar, to prevent the animal from backing out of the stall, the legs of the bar being pivotally connected to the respective side walls of the stall adjacent the rear end thereof. Normally the member is in a substantially horizontal position, but may be raised to a vertical position to permit the animal to back out of the stall when it is so desired, the bar being preferably so mounted that it may be adjusted either in a vertical or a horizontal plane to accommodate animals of different sizes.

The invention consists in the novel constructions and arrangements to be hereinafter described and claimed for carrying out the above stated objects and such other objects as will appear from the following description of certain preferred embodiments illustrated in the accompanying drawings, wherein—

Fig. 1 is a rear elevational view of one complete stall and a portion of the stall adjacent thereto on one side embodying the principles of the invention showing one form of means for attaching the U-shaped stop members to the sides of the stall at the forward end;

Fig. 2 is a sectional view taken on the line 2—2 of Fig. 1;

Fig. 3 is a sectional view taken on the line 3—3 of Fig. 1, but showing another means for attaching the stop members at the forward end of the stall to the sides thereof; and Figs. 4 and 5 are sectional views taken on the lines 4—4 and 5—5, respectively, of Fig. 3.

Like characters of reference designate like parts in the several views.

Referring now to the drawings, the partitions or sides of the several stalls each comprise a vertically extending front post 8, a similarly extending rear post 9, and a plurality of horizontal bars 10 which are connected in any desired manner at their forward ends to the post 8 and at their rearward ends to the post 9. The posts 8 and 9 are preferably anchored at their lower ends to the curb 11 and floor 12, respectively. The posts 8 at their upper ends are preferably also attached to a horizontal transversely extending supporting bar 13 to provide a rigid construction.

Each stall at its forward end is provided with a pair of U-shaped stop members 14 each positioned with its legs extending toward the respective side wall of the stall these members being preferably formed of round tubular bars bent to the form shown in Fig. 1. In the form of the invention shown in Figs. 1 and 2 the members 14 are adjustably mounted on the posts 8 by means of devices 15 the adjacent ends of which are adapted to be clamped about the posts 8 by a plurality of bolts 16, the extremities of the members 14 being adjustably clamped between the upper and lower portions of the clamping devices by a plurality of bolts 17. It will be noted that this arrangement not only permits the members 14 to be fixed at any desired height on the posts 8, but also permits the members to be adjusted laterally so that the members of each stall may be moved toward or away from each other as may be desired to accommodate the particular animal occupying the stall. Vertical bars 18 are preferably secured across the U-shaped members 14 to prevent the animals from poking their heads therethrough.

In the form of the invention shown in Figs. 3 and 4 the U-shaped stop members 14 are adjustably attached by clamping devices 19 to the vertical portions of L-shaped members 20, the horizontal portions of said L-shaped members being adjustably connected to certain of the horizontal bars 10 by a two-part clamping device 21, see Fig. 4. This arrangement permits the U-shaped members 14 to be moved laterally and vertically relative to the L-shaped members 20 and it also permits the L-shaped members 20 to be moved either forwardly or rearwardly relative to the bars 10, thereby making it possible to adjust the members 14 to accommodate the particular animal occupying the stall.

The means for preventing the animals from backing out of the stalls comprises a normaly horizontally positioned U-shaped member 22, the extremities of the legs thereof being pivotally connected to vertically positioned supporting bars 23 secured to the intermediate horizontal bars 10 of the side of the stall. The bars 23 are provided with a plurality of perforations 23ª so that the member 22 may be adjusted vertically. The legs of the member 22 are also provided with a plurality of perforations 22ª which permits said member to be adjusted horizontally thereby accommodating animals of different lengths. Stop members 24 adjustably clamped to the respective posts 9 support the member 22 in a substantially horizontal position.

From the foregoing description it will be apparent that a stall embodying the principles of the invention permits the animal to have the maximum amount of freedom, the U-shaped members 14 at the forward end of the stall being adjusted laterally and vertically to acommodate the particular animal occupying any particular stall. It will be noted that the members 14 are relatively short in length so that by raising or lowering its head the animal may withdraw its neck from engagement with the members 14. The construction is such that the animal cannot creep under the members 14 nor can it jump over the members 14 and under the bar 13.

I claim:

1. A stall of the class described comprising means arranged to form the sides of the stall, means at the forward end of the stall to prevent forward travel of the animal therethrough, a U-shaped normally horizontally positioned member, and perforated bars connected to the sides of the stall adjacent the rear end thereof, said U-shaped member being adjustably and pivotally connected to said bars for the purpose described.

2. A stall of the class described comprising means arranged to form the sides of the stall, means at the forward end of the stall to prevent forward travel of the animal therethrough, and a U-shaped normally horizontally positioned member pivotally connected to the sides of the stall adjacent the rear end thereof, said member being adjustable in both horizontal and vertical planes for the purpose described.

3. A stall of the class described comprising means arranged to form the sides of the stall, a pair of relatively short members associated with the respective sides of the stall adjacent the front end thereof, said members being spaced so that the animal may place its neck therebetween, a U-shaped normally horizontally positioned member, and perforated bars connected to the sides of the stall adjacent the rear end thereof, said U-shaped member being adjustably and pivotally connected to said bars, for the purpose described.

4. A stall of the class described comprising means arranged to form the sides of the stall, a pair of relatively short members, means to mount said members on the respective sides of the stall adjacent the front end thereof, said last mentioned means permitting vertical and lateral adjustment of said members relative to the sides of the stall, and a U-shaped normally horizontally positioned member adjustably and pivotally connected to the sides of the stall adjacent the rear end thereof, for the purpose described.

5. A stall of the class described comprising means arranged to form the sides of the stall, a pair of relatively short members, means to mount said members on the respective sides of the stall adjacent the front end thereof, said last mentioned means permitting vertical and lateral adjustment of said members relative to the sides of the stall, and a U-shaped normally horizontally positioned member pivotally connected to the sides of the stall adjacent the rear end thereof, said last mentioned member being adjustable in both horizontal and vertical planes for the purpose described.

6. A stall of the class described comprising means arranged to form the sides of the stall, and means for mounting said U-shaped members positioned adjacent the front of the stall, and so arranged that the legs, thereof extend toward the respective sides of the stall, and means for mounting said U-shaped members whereby they may be adjusted vertically and laterally with respect to the sides of the stall.

7. A stall of the class described comprising means arranged to form the sides of the stall, a pair of relatively short U-shaped members positioned adjacent the front of the stall, and so arranged that the legs thereof extend toward the respective sides of the stall, and means for mounting said U-shaped members for vertical, lateral and longitudinal adjustment relative to the sides of the stall.

In testimony whereof, I affix my signature.
ROBERT F. RASMUSSEN.